Sept. 1, 1931.   J. A. FARNIK   1,821,884
RUMBLE SEAT TOP
Filed June 7, 1928   2 Sheets-Sheet 1
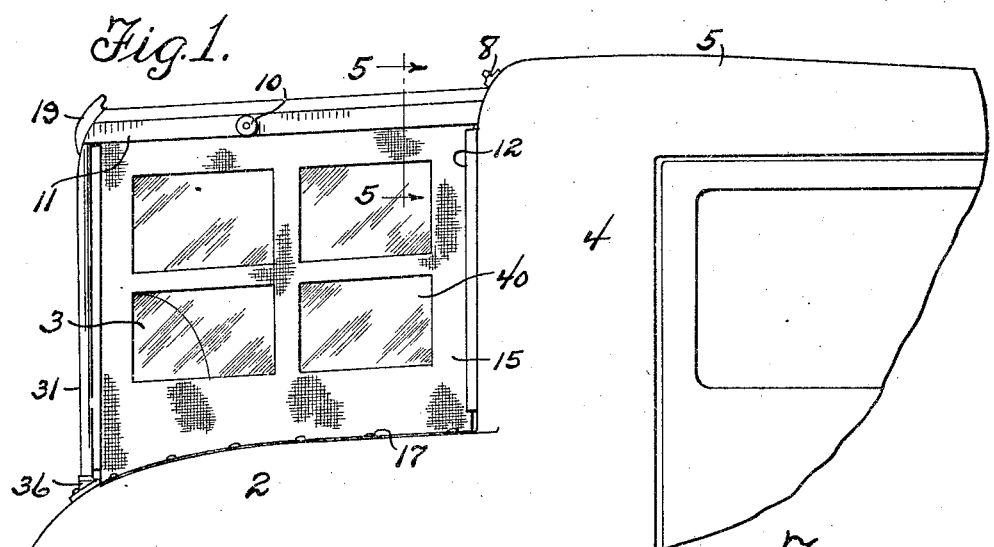
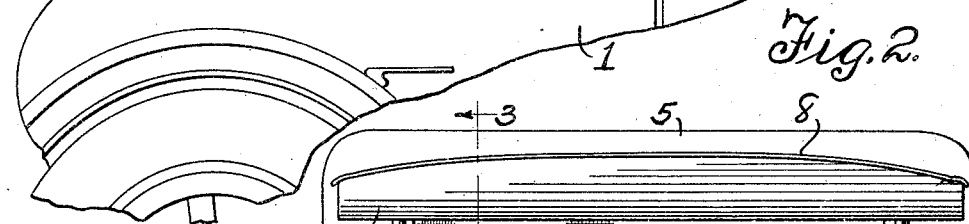
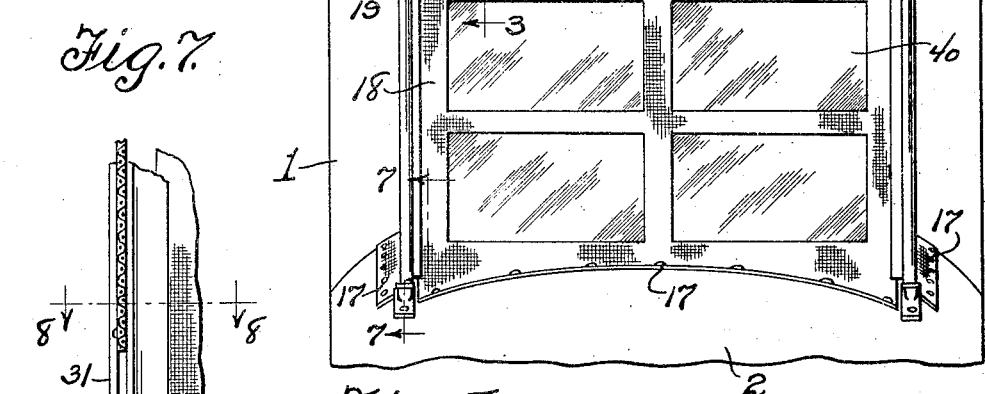
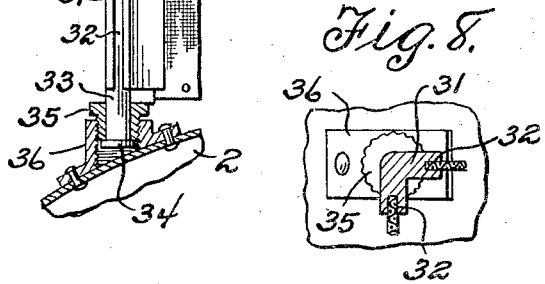
INVENTOR.
John A. Farnik
BY James F. Splain
ATTORNEY.

Sept. 1, 1931.      J. A. FARNIK      1,821,884
RUMBLE SEAT TOP
Filed June 7, 1928      2 Sheets-Sheet 2

INVENTOR.
John A. Farnik
BY
James F. Splain
ATTORNEY.

Patented Sept. 1, 1931

1,821,884

UNITED STATES PATENT OFFICE

JOHN A. FARNIK, OF ST. LOUIS, MISSOURI

RUMBLE SEAT TOP

Application filed June 7, 1928. Serial No. 283,523.

The object of my said invention is the provision of a rumble seat top for automobiles, etc., susceptible of being expeditiously and easily put into and out of use, and the latter in such manner that the idle rumble seat top is entirely enclosed and hidden from view and does not detract in any measure from the finished appearance of the automobile.

Other objects and practical advantages of the invention will be fully understood from the following description and claim when the same are read in connection with the drawings, accompanying and forming part of this specification, in which:—

Figure 1 is a view in side elevation illustrating the rumble seat top constituting the preferred embodiment of my invention as the same appears in use for the enclosure of the rumble seat.

Figure 2 is a rear end elevation of the same.

Figure 6 is a view taken in the same plane as Figure 5 but with the rumble seat top positioned in readiness for disposal thereof in the compartment alluded to.

Figure 7 is a fragmentary vertical section taken in the plane indicated by the line 7—7 of Figure 2, looking toward the left.

Figure 8 is a horizontal section taken in the plane indicated by the line 8—8 of Figure 7, looking downwardly.

Similar numerals of reference designate corresponding parts in all of the views of the drawings.

Figure 3:
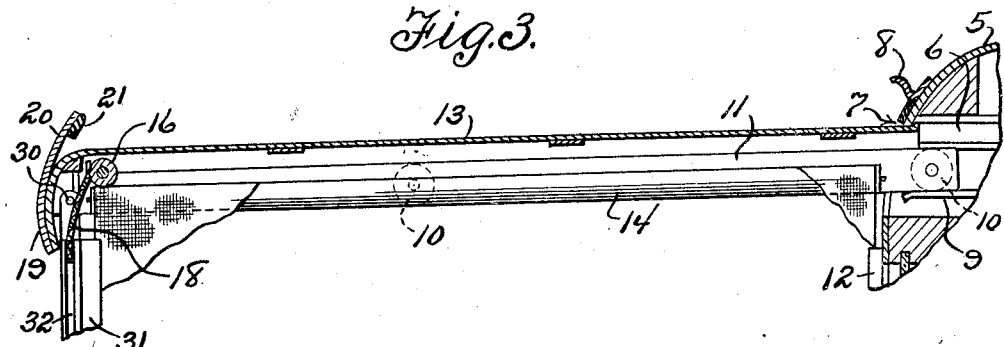
Figure 3 is a longitudinal vertical section, on an enlarged scale, showing the upper portion of the rumble seat top as the same appears when displaced from the compartment in the top or upper portion over the ordinary seat or seats of an automobile, taken on line 3—3 of Figure 2.

The automobile body 1 is provided with a rumble seat portion 2 in which is a rumble seat 3. It will also be understood that the said body 1 has a portion 4 of casing character which encloses the ordinary seat or seats complementary to the automobile body. The casing portion 4 includes a top 5 and in said top 5 is a compartment 6, Figures 3 and 4, open at its rear end as designated by 7 in Figure 3 and provided above its said open end 7 with a canopy 8.

Figure 4:
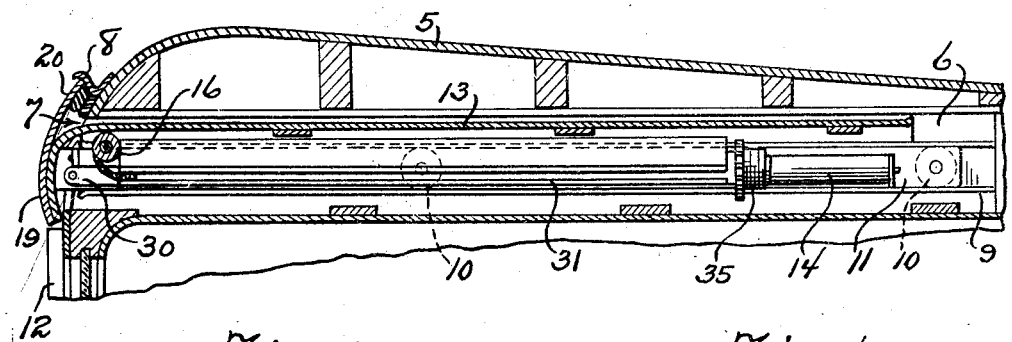
Figure 4 is a view similar to Figure 3 but showing the rumble seat top as housed in the said compartment and out of use.
Figure 5:
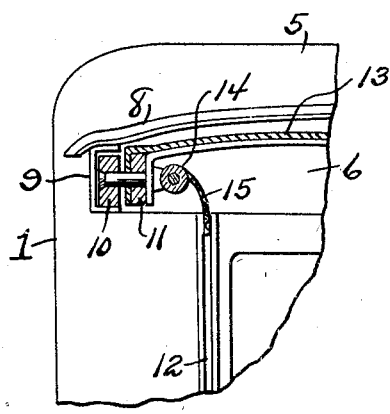
Figure 5 is an enlarged fragmentary section taken in the plane indicated by the line 5—5 of Figure 1, looking forwardly.

Fixed in the compartment 6 and at opposite sides thereof are channel guides 9, and movable longitudinally and rectilinearly in said channel guides 9 are anti-friction wheels or rollers 10 carried by the longitudinally movable main bars 11 of my top for the rumble seat 3. The casing 4 is provided on its rear transverse wall with vertical guides 12, and it will also be noted that the bars 11 carry a substantially horizontal portion 13 which extends between and is fixed to the bars 11, and that said bars 11 are also equipped with brackets in which are mounted spring-influenced rollers 14 for side curtains 15 of flexible type, and a spring influenced roller 16 for a rear curtain of flexible type. The said curtains are adapted to be rolled up on and withdrawn from their respective rollers in the ordinary manner common to spring-influenced shade rollers, and it will be understood that when the rumble seat top is withdrawn rearwardly from the compartment 6 in the top of the casing 4, the said curtains will be drawn downwardly against the action of their respective springs and will be fastened at 17 to the upper portion of the rear deck. The rear curtain alluded to is designated by 18. The upper portion of the rumble seat top 13 is equipped at its rear end with a pendent portion 19 designed when the rumble seat top is positioned as shown in Figure 4 to close the rear end of the said compartment 6 in the top of the casing 4. It will also be noted that carried by and extending upwardly from the said pendent portion 19 is a flange 20 adapted to be moved into and out of a position below the canopy 8, the said flange 20 being provided on its forward side with packing 21 designed to assist the flange 19 or rather the pendent portion 19 and the flange 20 in closing the compartment 6 in weather-proof manner when the rumble seat top is housed in the compartment 6 and is idle.

When the top of the rumble seat cover is extended as shown in Figure 3, and the side curtains are drawn downwardly, it will be noted that the side curtains will be disposed in the before mentioned channel guides 12 and will break joints with the said channel guides 12 so as to prevent the entrance of rain or wind between the forward edges of the said side curtains and the rear transverse wall of the casing 4.

Figure 6:
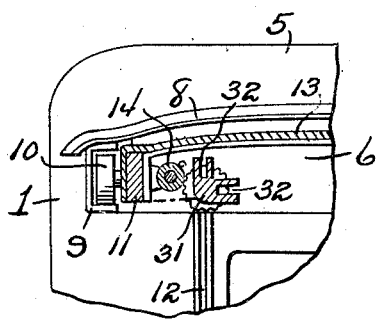

Pivotally connected at 30 to the rectilinearly movable bars 11 are curtain receiving and holding members 31. The said members 31 are of right angle form in cross-section, Figure 8, and are provided in both of their portions with channels 32, Figures 6 and 8, and it will be noticed that the said members 31 terminate at their free ends in portions 33 of circular form in cross-section on which are enlargements 34, Figure 7. The said portions 33 are to carry and permit free turning of exteriorly threaded nuts 35, and when the members 31 are in upright position as shown in Figures 3 and 7, the said nuts 35 are adapted to be socketed in and engaged with socket members 36 fixed on the rumble in rear of and at opposite sides of the opening in the top of the said rumble. The channels in the members 31 are to receive the edges of the side and back curtains so that the members 31 which form the rear corners of the enclosure shown in Figures 1 and 2 break joints with the side and rear curtains and in that way exclude the weather and also assist in maintaining the side and rear curtains against deflection.

The side and rear curtains may be and preferably are provided with transparent panes or panels of flexible celluloid or other appropriate material. The said panels being designated by 40.

It will be apparent from the foregoing that when my novel rumble seat top is idle, the members 31 will extend forwardly from their pivot connections 30 and will lie alongside the rollers of the side curtains, all of the curtains being at such time coiled about their rollers so that the rumble seat top as a unit may be slid forwardly into the compartment 6. Manifestly when the rumble seat top is positioned as just stated, said top will be hidden from view and will in no measure detract from the finished appearance of the automobile and the rumble seat of the automobile will be exposed in the conventional manner. When, however, inclement weather is threatened and it is desired to enclose the rumble seat, it is simply necessary for the person having charge of the automobile to withdraw the rumble seat top rearwardly from the compartment 6, swing the corner members 31 downwardly and connect the same to the sockets 36 in the manner before described, and then draw the curtains downwardly against the action of the springs of their respective rollers and so that the curtains are disposed in the channels provided for their reception and then fasten the ends of the curtains to the rumble 2 whereupon the rumble seat 3 will be effectively enclosed and the occupants of the said seat 3 will be efficiently protected against the weather. When it is desired to pull the rumble seat cover from the position shown in Figure 1 to that shown in Figure 4, the operation described is reversed.

It will be readily appreciated from the foregoing that my improvement is adapted to be manipulated with great facility as is desirable in the event of a suddenly developing rain storm; and it will also be appreciated that when my rumble seat top is housed in the compartment 6 in an ordinary automobile top, the rumble seat 3 is left exposed in conventional manner so that the occupants of the said seat 3 may get the benefit of the open air. It will further be appreciated that when it is desired to put my rumble seat top out of use, the same may be readily effected subsequently to the detachment of the curtains at the points 17 from the rumble 2. In this latter connection I would have it understood that the fastenings 17 may be of any character compatible with the ready connection and disconnection of the side and rear curtains at the points indicated. It will further be gathered that the members 31 are susceptible of quick and easy connection to and disconnection from the sockets 36, and that when connected to the said sockets 36 the members 31 constitute stable braces and supports for the rumble seat top as a whole.

I have entered into a detailed description of the construction and relative arrangement of the parts embraced in the present and preferred embodiment of my invention in order to impart a full, clear and exact understanding of the said embodiment. I do not desire, however, to be understood as limiting myself to the specific construction illustrated and described, my invention being defined by my appended claim within the scope of which modifications may be made without departure from my invention. For instance my improvement is applicable to aeroplanes and all other vehicles as well as automobiles, and therefore the term automobiles as herein employed is intended to comprehend vehicles of all descriptions.

Having described my invention, what I claim and desire to secure by Letters Patent, is:—

The combination in a vehicle, of a casing portion having a top and a compartment, open at its rear end in said top, and also having a rumble and threaded sockets at the upper side thereof, fixed longitudinal guides at opposite sides of said compartment, bars having wheels lateral thereto movable longitudinally in said guides, a top fixed to and movable as a unit with said bars, spring-influenced side rollers and a spring-influenced rear-end roller carried by said bars, curtains on said rollers, curtain-receiving members pivotally connected at ends thereof to the rear ends of said bars and each having grooves at right angles to each other and movable when folded parallel to the bars into and out of said compartments and also having free end portions of circular cross-section with end enlargements, and nuts turnable about said free end portions and in and out of the sockets on the rumble.

In testimony whereof I affix my signature.

JOHN A. FARNIK.